No. 692,170. Patented Jan. 28, 1902.
M. WALLERSTEIN & H. H. FREUND.
APPARATUS FOR AERATING WORT AND IMPROVING THE QUALITY OF YEAST.
(Application filed May 23, 1901.)
(No Model.)
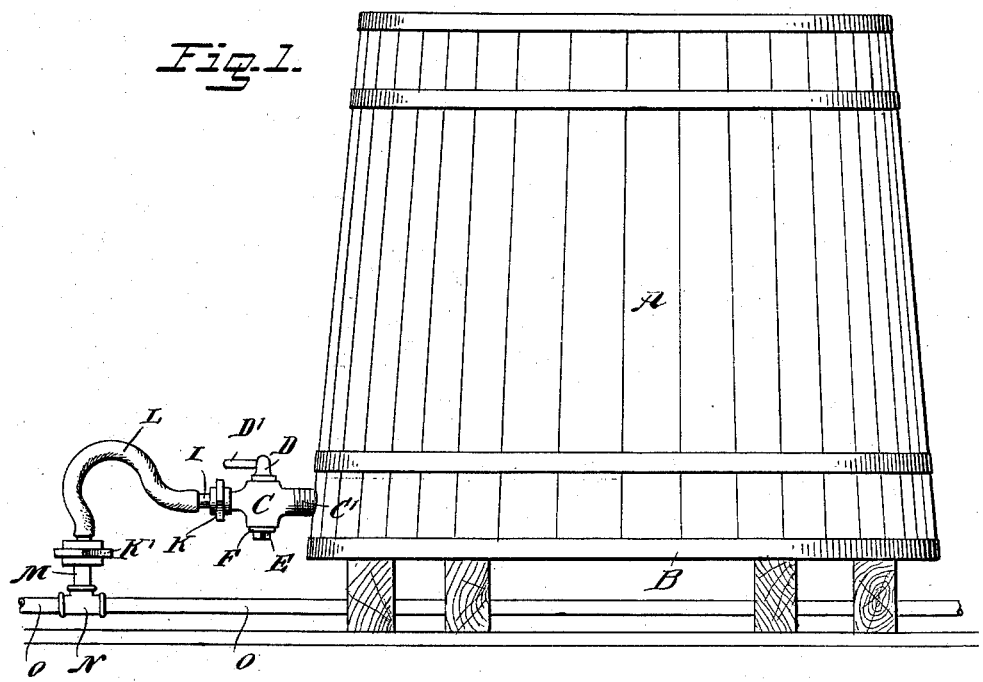
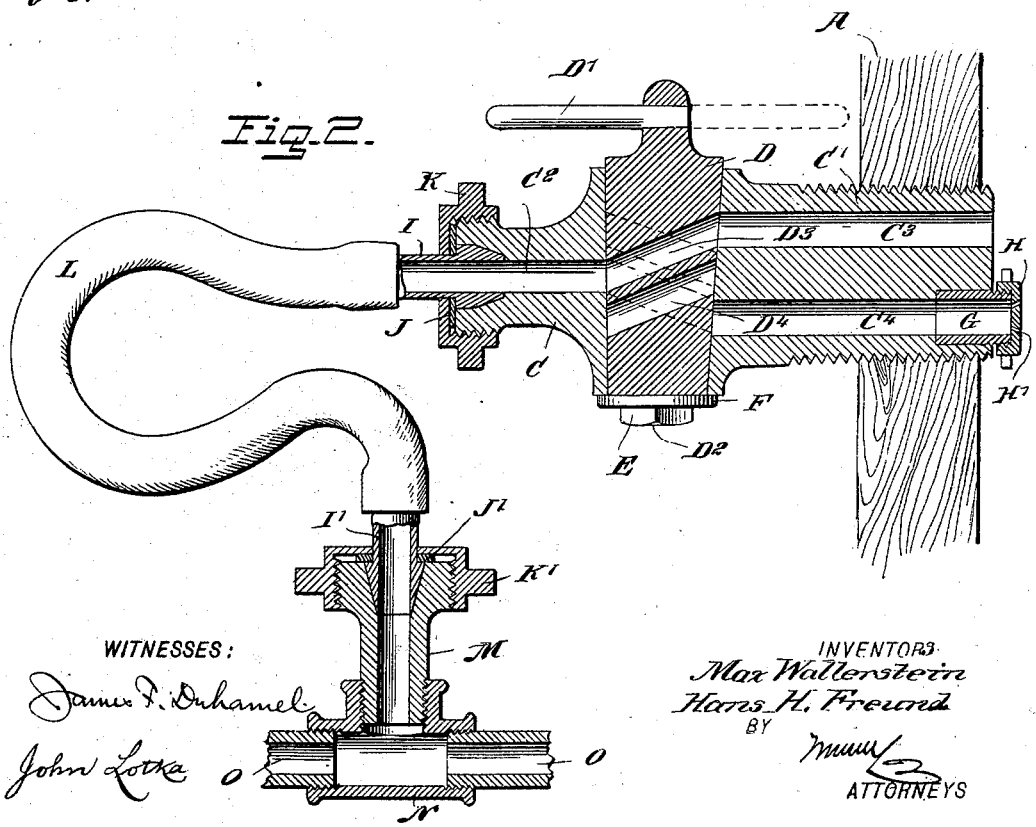
WITNESSES:
INVENTORS
Max Wallerstein
Hans H. Freund
BY
ATTORNEYS

UNITED STATES PATENT OFFICE.

MAX WALLERSTEIN AND HANS H. FREUND, OF NEW YORK, N. Y.

APPARATUS FOR AERATING WORT AND IMPROVING THE QUALITY OF YEAST.

SPECIFICATION forming part of Letters Patent No. 692,170, dated January 28, 1902.

Application filed May 23, 1901. Serial No. 61,536. (No model.)

*To all whom it may concern:*

Be it known that we, MAX WALLERSTEIN and HANS H. FREUND, subjects of the Emperor of Germany, and residents of the city of New York, borough of Manhattan, in the county and State of New York, have invented new and useful Improvements in Apparatus for Aerating Wort and Improving the Quality of Yeast, of which the following is a full, clear, and exact description.

Our invention relates to apparatus for aerating wort during fermentation and improving the quality of yeast, and has for its object to provide an apparatus of this class by the use of which wort is aerated with filtered air in any desired quantity during fermentation and yeast of healthy growth and great purity is obtained. To this end we employ an apparatus constructed substantially as hereinafter described, and particularly pointed out in the appended claims.

Reference is to be had to the accompanying drawings, forming a part of this specification, in which similar characters of reference indicate corresponding parts in both figures.

Figure 1 is a side elevation of a vat provided with our improvements, and Fig. 2 is a detail sectional elevation of the air-admission device and the part of the vat to which it is applied.

A represents a vat of the usual construction. Adjacent to the bottom B the vat has a lateral opening, into which fits or screws the inner end C' of a cock-casing C. This casing is provided with a vertical bore or seat for a conical plug or key D, having a handle D' and a suitable arrangement for obtaining a tight joint, and has a nut E, screwing on a stem $D^2$ of the plug and abutting against a head or washer F at the bottom of the casing C. At the side farthest from the vat the casing has a single passage $C^2$, adapted to register, according to the position of the plug D, with either of two superposed ports $D^3$ $D^4$ in said plug. Between the plug and the vat the casing has two passages $C^3$ $C^4$, arranged to register with the ports $D^3$ $D^4$, respectively. The upper passage $C^3$ has its inner orifice of the same size as its bore. The lower passage $C^4$ has at its inner end a nipple G, projecting into the vat A and screw-threaded to receive a cap H, provided with a series of small apertures H', preferably converging inwardly.

At its outer end the casing C is provided with a seat for a connecting-nipple I, having a shoulder against which a washer J is pressed by means of a cap K, screwing on the outer end of the casing. The nipple I is connected by a rubber tube L or equivalent means with a similar nipple I', held by a washer J' and cap K' against a seat in a casing M, which screws into a union N, connecting two pipe-sections O. These sections form part of a pipe connected with a supply of filtered air.

When the wort has been pitched with the necessary quantity of yeast, the cock D' is first turned into the position shown by full lines in Fig. 2, so that a relatively solid jet of air will be discharged into the wort in an amount sufficient to thoroughly mix the wort and yeast and to supply the oxygen necessary for the growth of the yeast. The rousing is continued until the wort and yeast have been well mixed.

When a white scum or foam appears on the surface of the liquid and the yeast is in a vigorous state of fermentation, the cock D' is turned, so as to cause air to pass through the lower port $D^4$ to the passage $C^4$ and apertures H'. In this position the cock is left from two to three hours or longer, according to the quality of the yeast and the character of the beer.

As the quantity of air introduced is very small, it is possible to aerate the wort even when the yeast is in vigorous fermentation, which, although of great importance, has been impossible hitherto, since the wort would overflow in such a case.

With our apparatus the air is introduced so gradually and the quantity so limited and its flow is so easily regulated that the drawback mentioned above is avoided. As the aeration of the wort by means of our apparatus is well within control and moderate, an overaeration, causing thinness of character and deficiency in flavor and aroma of beer, is prevented.

The advantages of our treatment are as follows: The yeast-crop is increased and a very healthy vigorous yeast of great purity is obtained. The time of fermentation is shortened from two to three days. The beer clarifies quicker and better, so that the use of fining may be omitted and the quantity of chips reduced. Besides, the quantity of nitrogenous substances is reduced, and therefore a beer of better-keeping quality results. Most remarkable is, furthermore, the white color of the yeast.

Altogether a considerable saving of time, labor, and money is effected by our apparatus.

Having thus described our invention, we claim as new and desire to secure by Letters Patent—

1. An aerating-faucet for fermenting-vats, comprising a casing adapted for connection with the vat and with a supply of air, said casing having two passages leading toward the vat, one of said passages having a relatively large inner orifice, and the other a plurality of small orifices, and a movable plug having ports adapted to connect the air-supply with one or the other of said passages.

2. An aerating-faucet for fermenting-vats, comprising a casing having a plug-seat and adapted to be secured to the vat, the casing having a single passage leading outward from the plug-seat and adapted for connection with an air-supply, and two passages leading inward from the plug-seat toward the vat, one of the said inward passages having a relatively large orifice at the vat end, and the other a plurality of small orifices, and a plug mounted to turn on said plug-seat and having two ports adapted to connect the outward passage with one or the other of the inward passages.

In testimony whereof we have signed our names to this specification in the presence of two subscribing witnesses.

MAX WALLERSTEIN.
    HANS H. FREUND.

Witnesses:
  JOHN LOTKA,
  JNO. M. RITTER.